US007010608B2

(12) United States Patent  
Garg et al.

(10) Patent No.: US 7,010,608 B2  
(45) Date of Patent: Mar. 7, 2006

(54) SYSTEM AND METHOD FOR REMOTELY ACCESSING A HOME SERVER WHILE PRESERVING END-TO-END SECURITY

(75) Inventors: Ajay Garg, Hillsboro, CA (US); Ulhas Warrier, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 09/965,934

(22) Filed: Sep. 28, 2001

(65) Prior Publication Data

US 2003/0065791 A1    Apr. 3, 2003

(51) Int. Cl.  
G06F 15/16    (2006.01)  
G06F 15/173    (2006.01)

(52) U.S. Cl. ............................ 709/229; 709/225; 726/3
(58) Field of Classification Search ........ 713/200–202; 709/229, 237, 225; 726/3, 11, 12, 15  
See application file for complete search history.

(56) References Cited

U.S. PATENT DOCUMENTS

| 6,055,236 | A  | * | 4/2000  | Nessett et al. ............... 370/389 |
| 6,173,399 | B1 | * | 1/2001  | Gilbrech ....................... 713/153 |
| 6,477,145 | B1 | * | 11/2002 | Moore .......................... 370/231 |
| 6,567,405 | B1 | * | 5/2003  | Borella et al. ............... 370/389 |
| 6,795,918 | B1 | * | 9/2004  | Trolan ......................... 713/160 |
| 6,813,715 | B1 | * | 11/2004 | Yi ............................... 713/201 |
| 6,856,800 | B1 | * | 2/2005  | Henry et al. ................. 455/411 |
| 6,856,991 | B1 | * | 2/2005  | Srivastava ................... 707/10 |
| 6,862,281 | B1 | * | 3/2005  | Chandrasekaran .......... 370/392 |
| 2002/0078379 | A1 |   | 6/2002  | Edwards et al. |
| 2003/0065791 | A1 | * | 4/2003  | Garg et al. .................. 709/229 |

OTHER PUBLICATIONS

Siepmann, Frank, "SOHO security solutions", Network Computing, v 11, n 6, p 88-92, Apr. 2000.*  
Steinfeld, E.F., "Embedded web servers invade SOHO", Dedicated Systems Magazine, p 6-10, Dec. 2000.*

* cited by examiner

Primary Examiner—Jason D Cardone  
(74) Attorney, Agent, or Firm—Blakely, Sokoloff, Taylor & Zafman LLP (57) ABSTRACT

The invention relates to a system and method to allow a remote client to remotely access a home server of a home or private network while preserving end-to-end security. A home server includes a service component. When a server application performs a network operation to start listening for a connection from a remote client, it is detected by the service component. The remote client is coupled through the Internet and through an Internet agent to a home gateway running a Network Address Translation (NAT) software program. The gateway connects to a forwarding agent. The forwarding agent is connected to the home server and provides the Internet agent with access parameters received from the home server. If the remote client provides proper access parameters to the Internet agent, the Internet agent provides the remote client access to services running on the home server.

6 Claims, 5 Drawing Sheets

SYSTEM AND METHOD FOR REMOTELY ACCESSING A HOME SERVER WHILE PRESERVING END-TO-END SECURITY

BACKGROUND

1. Field of the Invention

This invention relates to communications in networks. In particular, the invention relates to a system and method for remotely accessing a home server while preserving end-to-end security.

2. Description of Related Art

Home networking is a fast emerging trend spurred by the availability of broadband access and networked devices for use in the home or office. Small office/home office (SOHO) and residential computers may permanently connect to external networks such as the Internet via these broadband connections. The computers within a SOHO or a residential environment can be connected together by private or home networks to share resources including the broadband connection. A private/home network can be connected to the broadband connection via a gateway device such as a personal computer running gateway software or a special purpose gateway device. A common configuration that is seen in private/home networks involves an Internet Gateway device (IGD) running Network Address Translation (NAT) software.

Basically, gateways utilizing NAT allow a user to share a public (routable) Internet Protocol (IP) address obtained from an Internet Service Provider (ISP) between multiple IP devices that use private (non-routable) IP addresses in the private/home network. Gateways using NAT map connections from within the private network to connections outside the network to the Internet. NAT allows the private network to set up one set of Internet Protocol (IP) addresses for use on the private network and another set of IP addresses (typically one) for use on the Internet. The IP addresses for use on the private network are reserved IP addresses set aside for use on the private network and are not valid routable IP addresses on the Internet.

Thus, currently, private/home networks work fine for applications that initiate connections to the Internet (e.g. a Web browser). Unfortunately, an application (like a Web server) cannot service connections that originate from the Internet, because NAT blocks all incoming connections. Moreover, although there are some work-around solutions being proposed to remedy this, they either require re-configuration of the IGD or the splitting of the point-to-point session by an intermediary system, thus breaking end-to-end security models.

BRIEF DESCRIPTION OF THE DRAWINGS

The features and advantages of the present invention will become apparent from the following description of the present invention in which.

DESCRIPTION

Embodiments of the present invention provide a system and method that allows a remote client to remotely access a home server of a home or private network while preserving end-to-end security. More particularly, embodiments of the invention support the use of existing client and server applications (such as Web browsers) to access a service application in the home network while preserving end-to end security for the applications.

One embodiment of the present invention adds a service component to the home server. The service component is installed in the network software stack of the home server system such that it can intercept the network operations of the home server. Specifically, when a server application performs a network operation to start listening for a connection from a remote client, it is detected by the service component. The remote client is coupled through the Internet and through an Internet agent to a home gateway running a Network Address Translation (NAT) software program. The gateway connects to a forwarding agent. The forwarding agent is connected to a home server and provides the Internet agent with access parameters (e.g. a username and a password) that the home server is configured with. The access parameters are initially used by the Internet agent to identify a particular remote client so that the Internet agent can forward its service access requests to a specific home server via the forwarding agent.

Once the necessary connections are set up, the remote client may additionally be required by a server application on the home server to provide authentication information for authorizing access, if this is a secure server. Because both the forwarding agent and the Internet agent act as layer 4 routers at this point of the process, embodiments of the invention provide a system and method for a remote client to access a server application behind NAT while achieving end-to-end session level security.

In the following description, the various embodiments of the present invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, electrical structures and circuits, are not described in detail, or are shown in block diagram form, in order not to obscure the present invention. Furthermore, aspects of the invention will be described in particular embodiments but may be implemented in hardware, software, firmware, middleware, or a combination thereof.

In the following description, certain terminology is used to describe various features of the present invention. In general, a "network" comprises one or more end nodes having physical connections to one or more networking devices of the network. However, it should be appreciated that physical connections between peers are not always required, such as in, for example, a wireless system. A "networking device" generally comprises hardware and/or software used to transfer information through a network. Examples of a networking device in this description include a forwarding agent, a gateway, an Internet agent, a router, a switch, a repeater, or any other device that facilitates the forwarding of information. An "end node" normally comprises a combination of hardware and/or software that constitutes the source or destination of the information. Examples of an end node include devices such as a home server, server, file server, application server, computer, workstation, fax machine, video source, printer, set-top box and other like devices. "Data traffic" generally comprises one or more signals having one or more bits of data, address, control or any combination thereof transmitted in accordance with any chosen scheme. "Data traffic" can be data, voice, address, and/or control in any representative signaling format or protocol. A "link" is broadly defined as one or more physical or virtual information carrying media that establish a communication pathway such as, for example, optical fiber, electrical wire, cable, bus traces, wireless channels (e.g. radio, satellite frequency, etc.) and the like.

Generally, embodiments of the invention can be utilized in a network that is packetized, packet-switched, connectionless, connection oriented, etc. For example, exemplary networks can utilize Transmission Control Protocol/Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. A network allows the communication of data traffic between any end nodes in the network using packets. Data traffic through the network may be of any type including data, voice, graphics, video, audio, e-mail, Fax, text, multi-media, documents and other generic forms of data. The network is typically a data network that may contain switching and/or routing equipment designed to transfer digital data traffic.

Figure 1A:
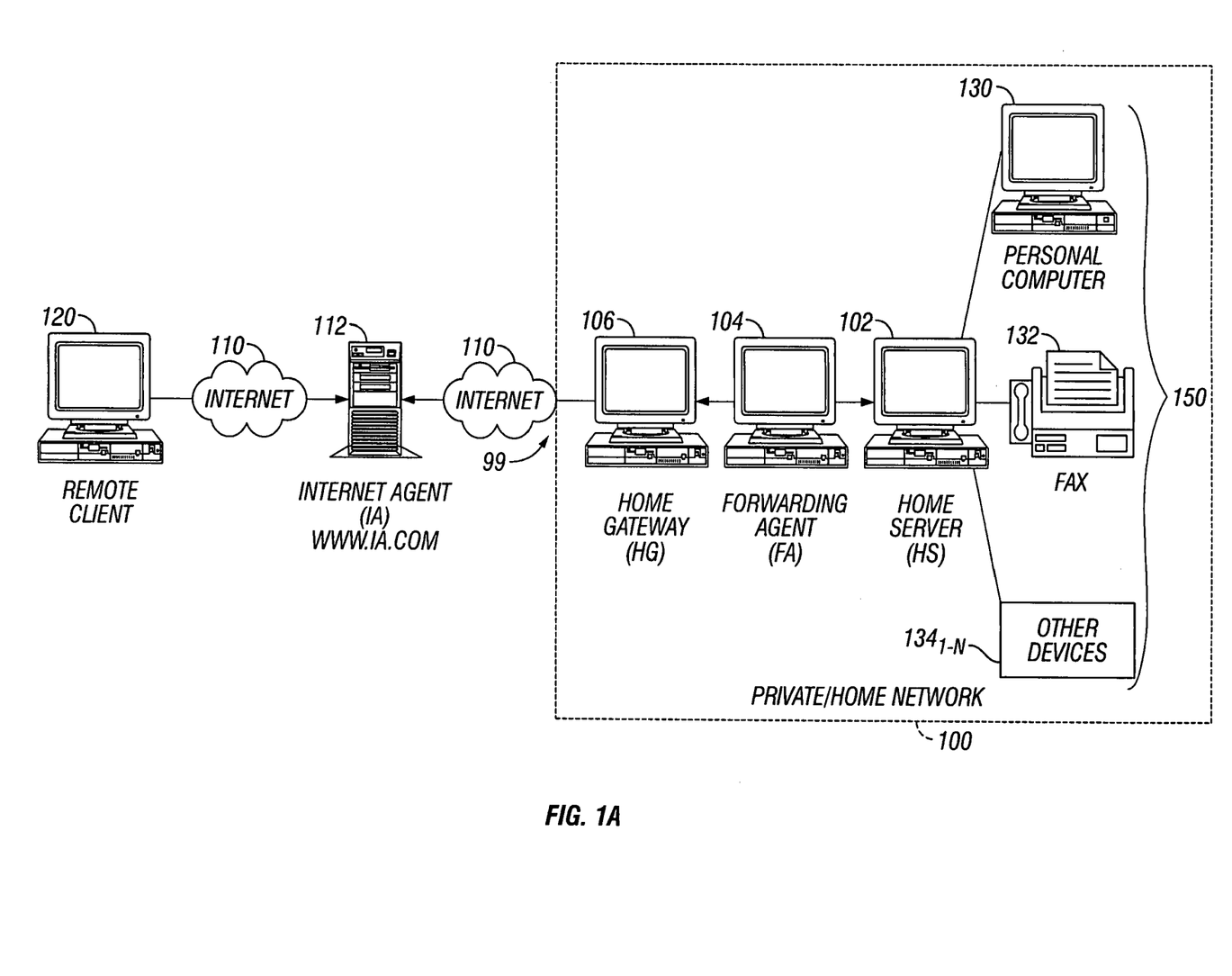
FIG. 1a is a diagram illustrating a network including a home server according to one embodiment of the invention.

FIG. 1 is a diagram illustrating an exemplary network 99 according to one embodiment of the invention. The exemplary network 99 includes a home or private network 100 coupled through the Internet 110 and an Internet agent 112 to a remote client 120. The home or private network 100 includes a home server 102, a forwarding agent 104, and a home gateway 106. As will be discussed, the home server typically runs a plurality of server applications, as well as, a service component. Attached to the home server 102 can be a plurality of other devices 150. For example, as shown in FIG. 1 a personal computer 130, a fax 132, as well as a plurality other devices 134$_{1-N}$ can be attached. It should be appreciated that although FIG. 1 shows the components of the home network 100 logically separated, it is possible in some embodiments for the home server 102, the forwarding agent 104, and the home gateway 106 to reside on the same machine (e.g. the same computer system).

In this illustrative embodiment, the home server 102 includes a service component. The service component is installed in the network software stack of the home server system such that it can intercept the network operations of the home server. Specifically, when a server application performs a network operation to start listening for a connection from a remote client, it is detected by the service component. The remote client 120 is coupled through the Internet 110 and through an Internet agent 112 to a home gateway 106 running a Network Address Translation (NAT) software program. As shown in FIG. 1, the gateway 106, the forwarding agent 104 and the home server 102 are connected to one another via links, as previously discussed to transfer data traffic. It should be noted that the forwarding agent 104 establishes an outgoing connection with the Internet agent 112 via the home gateway 106. This connection is used as a channel for remote clients to communicate to the home server 102 through the home gateway 106 that runs NAT. This process is used to circumvent the restriction imposed by NAT that blocks incoming connection requests from the Internet.

If the remote client 120 provides proper access parameters (e.g. a username and a password) to the Internet agent 112, it presents to the remote client 120 the services hosted on the home server 102 that are available to the remote client 120. When the remote client 120 requests a connection with a service, the Internet agent 112 sends an indication of this request to the home server 102 (via the forwarding agent 104). It uses the persistent connection initiated by the forwarding agent 104 (mentioned before) as the channel to send this from Internet to the private network through the NAT-enabled home gateway 106. This results in a new connection setup from the forwarding agent 104 to the home server 102 and new connection setup from the remote client 120 to the Internet agent 112. All subsequent data from the remote client 120 destined to the home server 102 is sent by the Internet agent 112 to the forwarding agent 104 through NAT using the persistent connection established by the forwarding agent 104. Moreover, because both the forwarding agent 104 and the Internet agent 112 merely act as layer 4 routers once the necessary connections are set up, the embodiments of the invention provide a system and method for a remote client 120 to access a server application behind NAT while achieving end-to-end session level security.

Thus, the network configuration 99 enables a remote client 120 to connect through an external network (e.g. the Internet 110) and into a private or home network 100. The remote client 120, via a network application, can establish a network connection to the home server 102 and further to attached devices 150 of the home server 102, such as the personal computer 130, the fax 132, and a multitude of other devices 134$_{1-N}$. The home server 102 is typically running at least one server application (web servers, game servers, FTP servers, IP telephony, etc.) that has opened a channel to listen for connections from remote devices. As will be discussed, if a remote client 120 logically establishes a connection to the home server 102, the data traffic may be routed between the remote client 120 and home server 102.

The remote client 120 can be any device capable of communicating with the external network (e.g. the Internet) such as a desktop computer, mobile computer, telephone, personal digital assistant, pager, etc. The private/home network 100 can be a secure network, e.g., a network protected by one or more security mechanisms such as one or more firewalls and/or bastion hosts. As will be discussed, end-to-end session level security is established when the remote client 120 accesses the home server 102 of the private/home network 100 which is hosting a server application.

Once the remote client 120 is connected to the home server 102, the remote client can use the home server 102 and the devices 150 (e.g. personal computer 130, fax 132, and other devices 134$_{1-N}$) attached thereto, as if the client were not remote and was actually located within the home network 100, i.e., the remote client 120 can access any applications, programs, and capabilities of the home server 102, and through the home server 102, the attached devices 150. For example, the remote client 120 can access applications for word processing, document editing, file deletion, printing, notifications, calendars, telephone messaging, electronic mail, file sharing, faxing, etc. The remote client 120 maybe able to access stored data sets and other applications, programs and capabilities of the home server 102 and the attached devices 150. The attached devices 150 can vary in type and include any devices capable of directly communicating with an external network and/or communicating with the external network through one or more other devices.

Figure 1B:
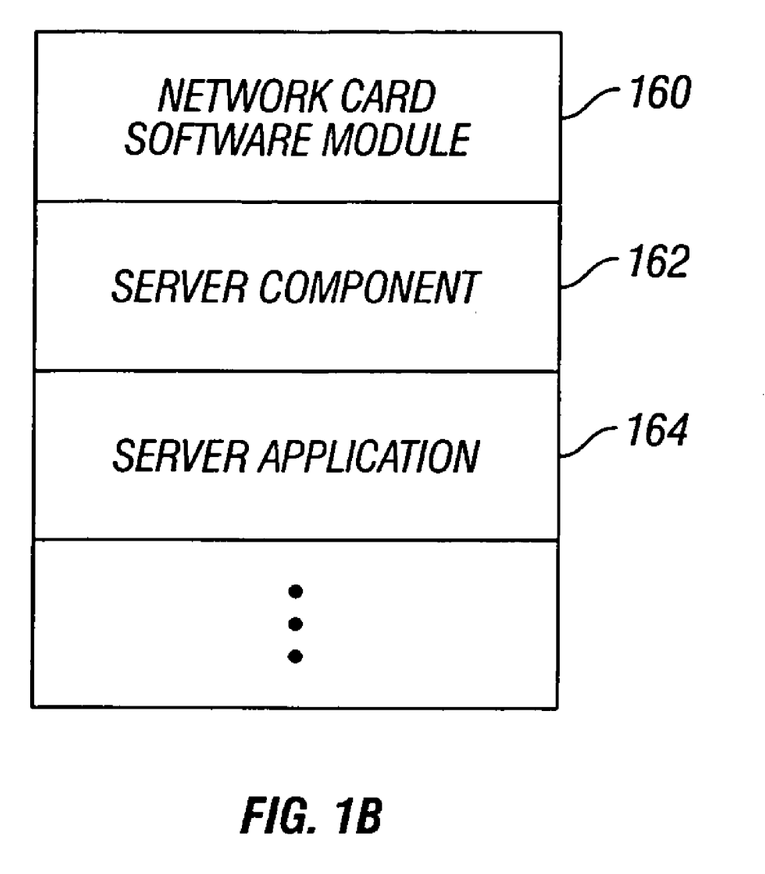
FIG. 1b is a diagram illustrating a service component residing on the home server of FIG. 1a according to one embodiment of the invention.

FIG. 1b is a diagram illustrating a service component 162 residing on the home server 102 of FIG. 1a according to one embodiment of the invention. The service component 162 is installed in the network software stack of the home server system such that it can intercept the network operations of the home server. As shown in FIG. 1b, the service component 162 can be located between the network card software module 160 and the server application 164. It should be appreciated that there can be any number of server applications. Particularly, when a server application 164 performs a network operation to start listening for a connection from a remote client, it is detected by the service component 162.

It should be appreciated that each of the home server 102, forwarding agent 104, home gateway 106, Internet agent 112, and remote client 120 are computing devices (e.g. machines) generally including a suitable processor and memory (e.g. a machine readable medium), along with other generally known hardware/software, to implement their general functions, as well as, functionality associated with embodiments of the invention, as will be discussed, to allow a remote client 120 to remotely access a home server 102 of a home or private network 100 while preserving end-to-end security. Moreover, embodiments of the invention can be implemented in hardware, software, firmware, middleware or a combination thereof.

When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc. Furthermore, while aspects of the invention and various functional components have been and will be described in particular embodiments, it should be appreciated these aspects and functionalities can be implemented in hardware, software, firmware, middleware or a combination thereof.

Figure 2:
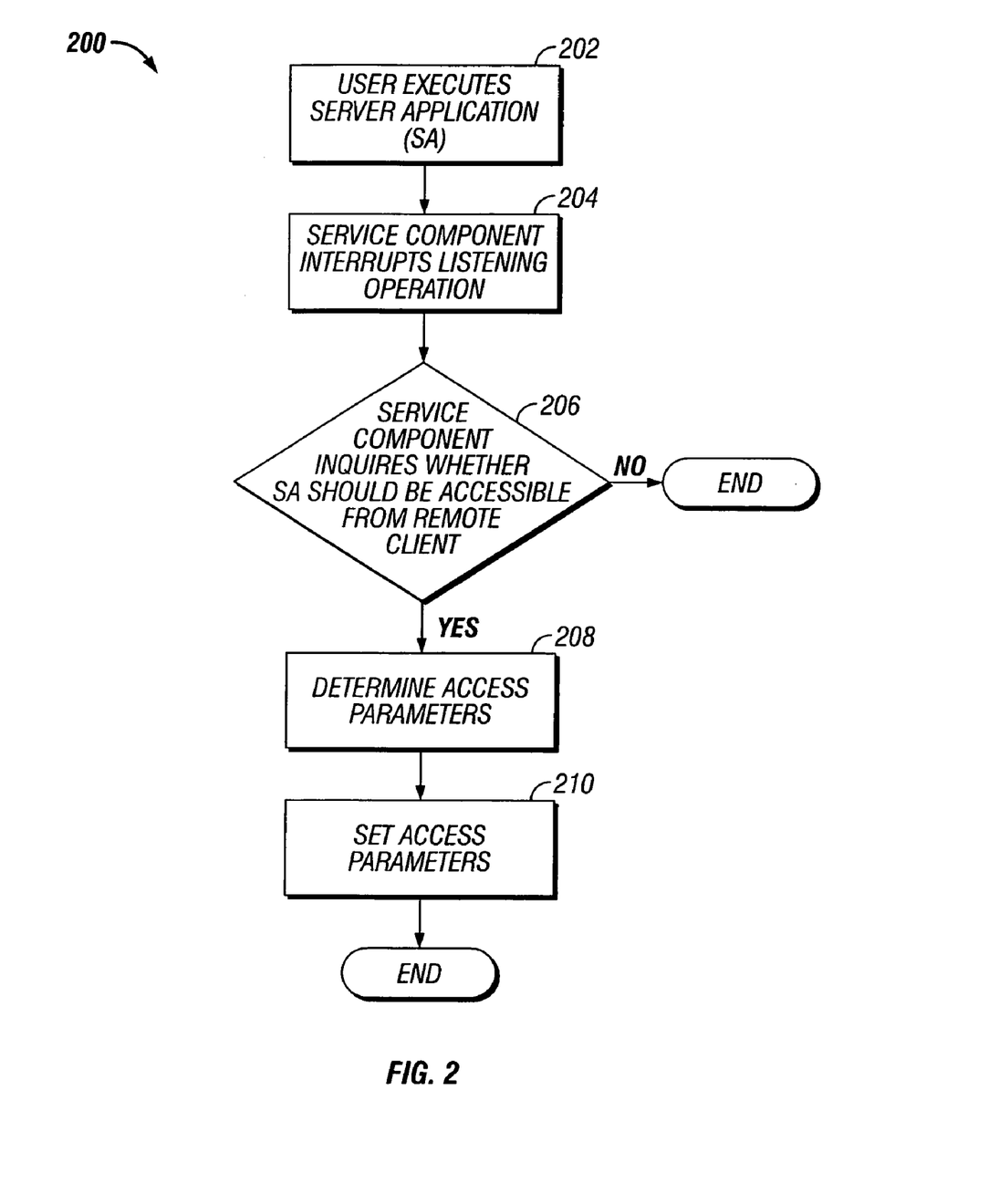
FIG. 2 is a flow diagram illustrating a process for setting access parameters according to one embodiment of the invention.

Referring now to FIG. 2, FIG. 2 is a flow diagram illustrating a process 200 for setting access parameters in order to allow a remote client 120 to remotely access a home server 102. As shown in block 202 of the process 200, a user executes a server application. When the user executes a server application on the home server 102, the home server 102 opens a channel to listen for connections. Typically this is done by opening a network 'socket' that abstracts the channel's network configuration parameters and performs 'listening' operations on the socket. The server application may include session level security (authentication/encryption) mechanisms such as Secure Socket Layer (SSL) on a secure Web server. SSL is currently the leading security protocol on the Internet. When an SSL session is started, the browser sends its public key to the server so that the server can securely send a secret key to the browser. The browser and server exchange data via secret key encryption during that session.

At block 204 of the process 200, a service component 162 residing on the home server 102 intercepts the 'listening' operation. One embodiment of the service component 162 is a Winsock Layered Service Provider (LSP). Next, during the process 200, the service component 162 inquires whether the server application should be accessible from a remote client 120 (block 206). This can be accomplished, for example, through a dialog interface. If the user does not want the service to be available from a remote client 120, then the process 200 ends.

On the other hand, if the user would like the server application to be accessible from the remote client 120, then the process 200 determines suitable access parameters (block 208). Again, this can be also accomplished through a dialog interface. Typical access parameters include a user-name and a password. The access parameters are identification information required to be entered from the remote client 120, such that the Internet agent 112 can use these parameters to identify the remote client 120 and associate the Internet Protocol (IP) address of the remote client 120 to the home server 102. This is because the Internet agent may simultaneously support multiple remote clients and multiple private networks enabled for remote access. Also, the remote client may be mobile and have different IP address each time remote session is initiated. Also note that the invention supports the use of multiple home server machines in a private network such that all of them will use a single forwarding agent. Next, the process 200 sets the access parameters (block 210). However, if the user has already entered access parameters before (e.g. for another server application), this step may not be required by the user, unless the user wishes to change the access parameters. Additionally, the process 200 can set an identification string for the server application. The identification string for the server application is used by the Internet agent 112 to inform the remote client 120 that the particular server application is up and running, and ready to receive connections (e.g., "XYZ telephony application ready").

Figure 3:
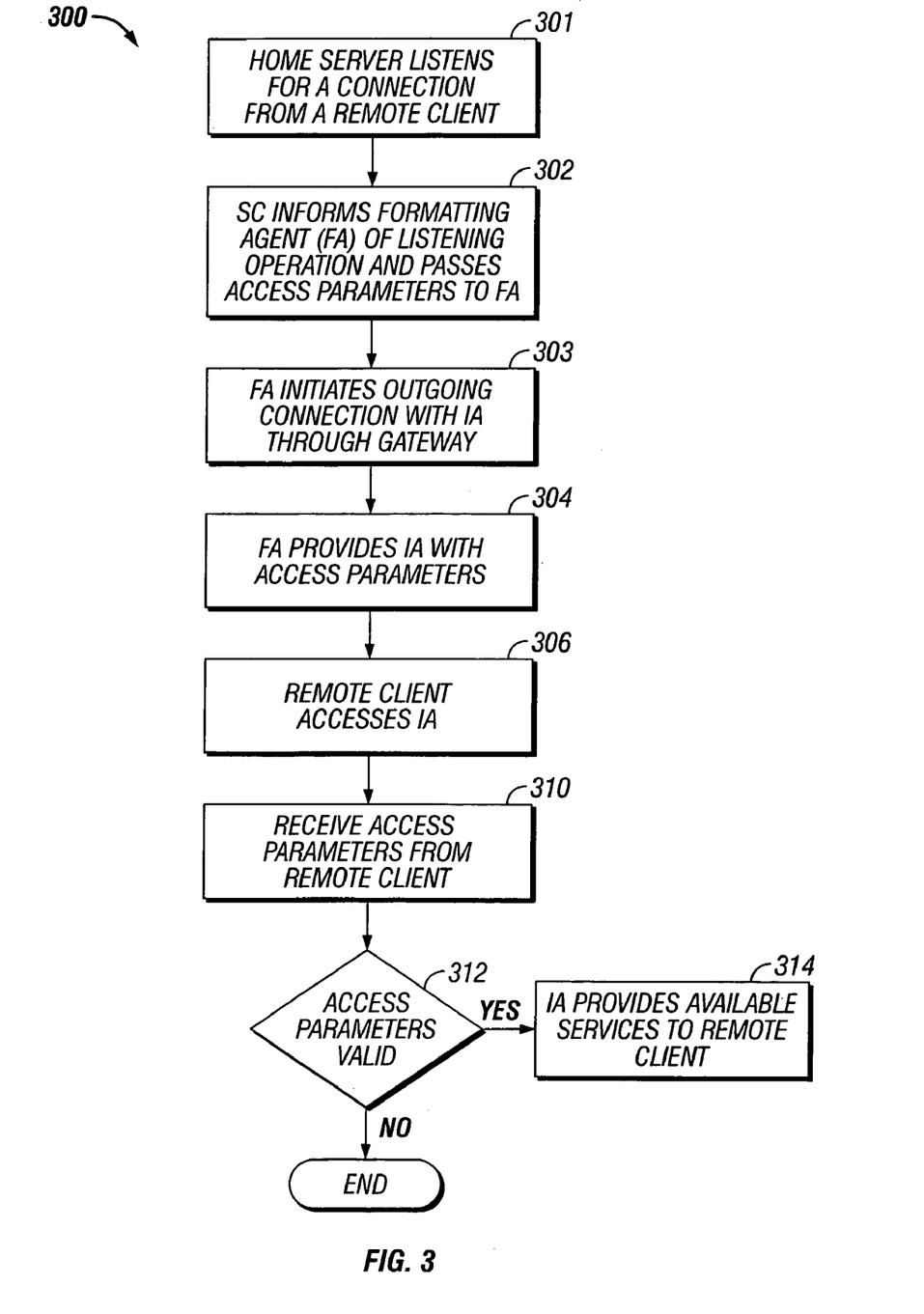
FIG. 3 is a flow diagram illustrating a process by which a home server authorizes access from a remote client according to one embodiment of the invention.

FIG. 3 is a flow diagram illustrating a process 300 by which a home server 102 authorizes access from a remote client 120 according to one embodiment of the invention. At block 301, the home server 102 listens for a connection from a remote client 120. As previously discussed, the service component 162 in the network software stack of the home server system intercepts the network operations of the home server such that, when a server application 164 of the home server 102 performs a network operation to start listening for a connection from a remote client, it is detected by the service component 162.

Next, at block 302, the service component 162 informs the forwarding agent 104 of the listening operation and passes access parameters to the forwarding agent 104. As previously discussed, the access information typically includes identification and security parameters (e.g. a user-name and password). The service component 162 lets the listening operation continue. Then, at block 303, the forwarding agent 104 initiates an 'outgoing' connection with Internet agent 112 through the gateway 106. This connection will be permitted by NAT since it is not initiated from the outside network. This connection will be used for relaying IP (Internet Protocol) traffic from the remote client 120 via the Internet agent 112. The forwarding agent 104 will maintain this connection until the service component 162 indicates to it that this connection is no longer needed, i.e., access from the Internet to services on the home server is not needed. At block 304, the forwarding agent 104 then provides the Internet agent 112 with the access parameters. The remote client 120 then begins the process of establishing a connection to the server application running on the home server 102 by first accessing the Internet agent (block 306).

At block 310, the Internet agent 112 receives the access parameters from the remote client 120. At block 312 the Internet agent 112 determines whether the access parameters are valid. If the access parameters are valid, then the Internet agent 112 will then present the services available on the corresponding home server 102 using the service identification strings mentioned earlier to the remote client 120. This information is used by the remote client 120 to access a particular service on the home server. On the other hand, if the access parameters do not match with any of the access parameters that the Internet agent 112 has received from various forwarding agents from different home networks, the remote client 120 is not shown any available services.

Figure 4:
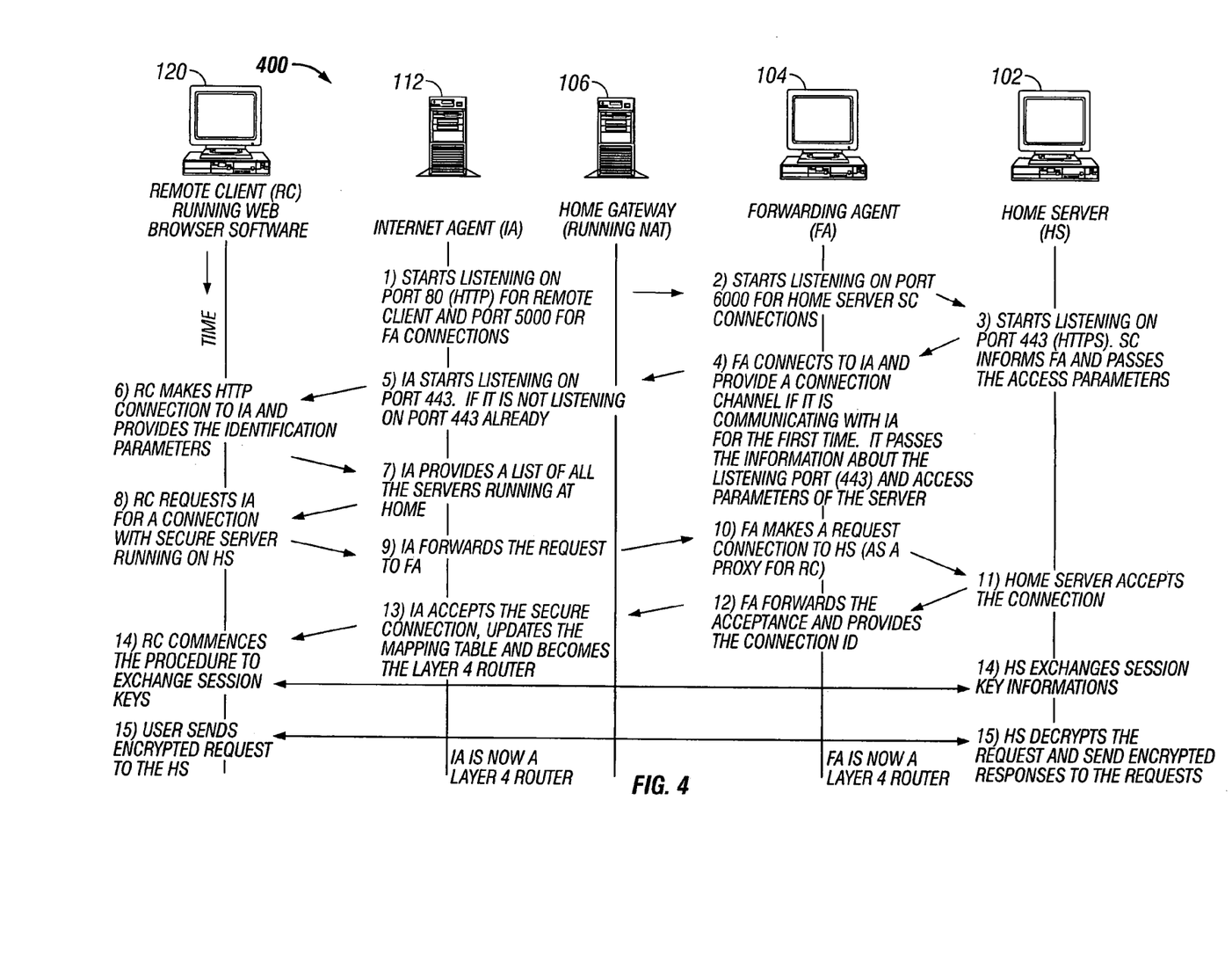
FIG. 4 is a flow diagram illustrating a more detailed process of FIG. 3 by which a home server authorizes access from a remote client according to one embodiment of the invention.

FIG. 4 is a flow diagram illustrating a more detailed process 400 of FIG. 3 by which a home server 102 authorizes access from a remote client 120 according to one embodiment of the invention. At time sequence 1), the Internet agent 112 starts listening on a port (e.g. port 80, Hyper Text Transport Protocol (HTTP)) for the remote client 120 and on another port (e.g. port 5000) for forwarding agent 104 connections. At time sequence 2), the forwarding agent 104 starts listening on a port (e.g. port 6000) for a service component 162 connection from the home server 102. Next, at time sequence 3), a particular service application on the home server 102 starts listening on a home server port (e.g. port 443 Hyper Text Transport Protocol Secure (HTTPS)) for a connection that it typically expects from the remote client 120. However, in this case because of a NAT in between, the remote client cannot directly connect to it. As previously discussed, the service component 162 in the network software stack of the home server system intercepts the network operations of the home server such that, when a server application 164 of the home server 102 performs a network operation to start listening for a connection from a remote client, it is detected by the service component 162. The service component 162 then informs the forwarding agent 104 that the home server 102 is listening and passes associated network parameters such as the home server port number (HSPN) (e.g. port 443) to the forwarding agent 104. Moreover, the service component 162 forwards access parameters (e.g. username and password) and other identification parameters onto the forwarding agent 104. The service component 162 then lets the listening to operation of the server application to continue.

At time sequence 4), the forwarding agent 104 connects to the Internet agent 112 and provides a persistent connection channel if it is communicating with the Internet agent 112 for the first time. Particularly, the forwarding agent 104 opens a channel (e.g. a TCP connection) through the gateway running NAT to the Internet agent 112. Furthermore, the forwarding agent 104 passes the information about the listening home server port number (HSPN) (e.g. port 443) and passes the access parameters of the home server 102 to the Internet agent 112. The connection between the forwarding agent 104 and the Internet agent 112 is used by the Internet agent 112 to reach the home server 102 (via the forwarding agent 104) and is kept open as long as connectivity from a remote client 120 is desired.

At time sequence 5), the Internet agent 112 starts listening to the home server port number (HSPN) (e.g. port 443), if it is not already listening to the HSPN already.

At time sequence 6), the remote client 120 makes a connection on port 80 (HTTP connection) to the Internet agent 112 and provides identification parameters. Thus, the remote client 120 starts its access of the home server 102 by first accessing a Web server running on the Internet agent 112. In order to do this, the remote client is first prompted for identification parameters. Next, at time sequence 7), the Internet agent 112 provides a list of all of the server applications running at the private or home network 100 to the remote client 120. Then, at time sequence 8), the remote client 120 selects (e.g. a user clicks on) the desired secure Web server, thereby requesting Internet agent 112 for a connection with the secure Web server. It should be appreciated that this secure Web server is one of the services offered on the home server 102 and is actually running on the home server 102. However, to the remote client 120 it appears as a service offered by Internet agent 112 and it requests Internet agent 112 for a connection on the specified port number (HSPN) (e.g. port 443). At time sequence 9), Internet agent 112, instead of accepting this connection request right away, sends a notification of this connection request to forwarding agent 104 (through the NAT running on the gateway 106) using the outgoing connection established by the forwarding agent 104 earlier (time sequence 4).

At time sequence 10), the forwarding agent 104 receives the connection request notification from Internet agent 112 and makes a connection request to the home server 102 (on behalf of the remote client 120). It should be noted that this is a request for a new connection. At time sequence 11), the home server 102 receives this new connection request from forwarding agent 104 on port number (HSPN) (e.g. port 443) and deals with it just as if this were an incoming connection request from a remote client. It should be noted that since this connection request is coming from the forwarding agent 104, which is a component of the private network, there are no NAT issues involved. If home server 102 accepts the connection, it will indicate this to the forwarding agent 104. The forwarding agent 104 in turn notifies Internet agent 112 of the acceptance of the connection request (time sequence 12). The forwarding agent 104 also provides Internet agent 112 a connection identifier ID, such as a socket descriptor that identifies the new connection between the forwarding agent 104 and the service application on the home server 102. The forwarding agent 104 now starts behaving like a layer four (4) router for this session.

At time sequence 13), on receiving the positive notification from the forwarding agent 104, the Internet agent 112 makes an entry in a mapping table of the remote clients that are making connections to the home server port number (HSPN) (e.g. port 443). The entry may preferably contain the following items:
1. identification of the remote client 120 (e.g., IP address).
2. the source port of the connection used by the remote client 120 to the Internet agent 104. This is typically assigned ad-hoc by the remote client system when the connection request is initiated.
3. the connection identifier supplied by the forwarding agent 104 that identifies the particular connection the forwarding agent 104 made to the home server 102 to be used for this session.

Internet agent 112 then accepts the connection from the remote client 120. From this point on, the Internet agent 112 acts as a layer 4 router for this session and simply routes all subsequent data using the mapping table entry to determine the destination of the data. Packets between the Internet agent 112 and forwarding agent 104 will include the connection ID in the header.

In one embodiment, a secure Web service can be utilized, although it should be appreciated that a non-secure Web service can also be used. In the case of a secure Web service, the endpoints need to agree on security parameters (e.g., encryption algorithms and keys) to be used for the session before any data can be exchanged. At time sequence 14), remote client 120 starts the session key negotiations with the Internet agent 112. These packets with the session key information are exchanged by Internet agent 112 and forwarding agent 104 through the NAT using the connection channel established earlier (time sequence 4). Also, they are transferred between forwarding agent 104 and home server 102 over the connection requested by the forwarding agent 104 (time sequence 10).

Once the security parameters are established through the handshake at time sequence 14, the remote client 120 and the home server 102 exchange data encrypted using the session keys (time sequence 15). It should be noted that the remote client 120 is communicating all the time with Internet agent 112, which acts as a proxy for the home server 102 through the forwarding agent 104.

All data traffic that comes from the remote client 120 to the home server port number (HSPN) (e.g. port 443) is sent to the forwarding agent 104 along with a connection ID. The forwarding agent 104 will then forward all the data traffic to the server application of the home server 102. Similarly, the forwarding agent 104 also forwards to the Internet agent 112 all data traffic sent to it from the server application of the home server 102 along with the appropriate connection ID in the header. The Internet agent 112 in turn, forwards the data traffic to the remote client 120. For example, the Internet agent 112 can use the connection ID to determine which particular remote client is the destination. Particularly, the authentication handshake will be part of this data traffic. Also, the data traffic may be encrypted. Importantly, end-to-end security is preserved since both the Internet agent 112 and the forwarding agent 104 are only forwarders of data traffic. Accordingly, at time sequence 15, the user sends encrypted requests to the home server 102 and the home server 102 decrypts the requests and sends encrypted responses back to the remote client 102.

Thus, at time sequence 15), the user of the remote client 120 might be required by the secure Web server running on home server 102 to log in to the service by entering authentication parameters (e.g. username and password). This information will flow between the remote client 120 and home server 102 using the Internet agent 112 and forwarding agent 104 as encrypted data, with end-to-end security preserved.

If the home server 102 denies access to the user, it breaks the connection that was accepted at time sequence 11. The forwarding agent 104 informs the Internet agent of this event (along with the connection ID) and the corresponding entry for the remote client 120 is removed from the mapping table. It also does this when the remote client closes the connection to terminate the session or as a result of inactivity from the remote client for a certain period. After this point, the remote client 120 can no longer access the service on the home server 102 without going through the connection initiation process (starting at time sequence 8).

It should be noted that if a second remote client now attempts to use the service on the home server, the connection set up process will ensue as described before time sequence 8, but time sequence 4 will not involve the forwarding agent 104 in making a new connection to the Internet agent 112; rather, it will use the existing connection. Time sequence 10 will result in making a new connection with the home server 102, and the Internet agent 112 will be provided with a new connection ID corresponding to this connection. This framework handles all access initiated from the outside to this private network (from different remote clients to different home servers) using a connection that was initiated from the forwarding agent 104 to the Internet agent 112 through the home gateway running NAT.

Thus, the remote client 120 can connect over at least two networks, e.g., the Internet 110 and the private/home network 100, via Internet protocols such as hypertext transfer protocol (HTTP), secure HTTP (HTTPS), and file transfer protocol (FTP). The remote client 120 can connect to the home server 102 using any type of web browser, e.g., Netscape Navigator™ and Microsoft Internet Explorer™. However, the remote client 120 need not use a web browser. The remote client 120 can run any network application or component that establishes network connections to other peers as part of its normal functionality.

Moreover, the connection between the remote client 120 and the home server 102 is on demand from whatever network application causes the connection to be established between the remote client 120 and the home server 102. This connection could be long-standing or temporary as determined by the network application at the remote client 120. As an example of a temporary connection, a user at the remote client 120 can web browse the private/home network 100 from a web browser at the remote client 120. The temporary connection ceases once the user points the web browser to a web site outside the private/home network 100. As an example of a long-standing connection, a home security control device as one of the other devices $134_{1-N}$ on the private/home network 100 can send alerts to the remote client 120 at a user's workplace to notify the user that someone has broken into his or her house.

Also, many of the connections, as previously discussed, utilize security protocols, such as Hyper Text Transport Protocol Secure (HTTPS), which is a protocol for accessing a secure Web server. Using HTTPS in the URL instead of HTTP directs the message to a secure port number rather than the default Web port number. The session can then be managed using a security protocol.

Accordingly, embodiments of the invention provide a technique that preserves end-to-end session level security even though it uses intermediaries (e.g. the Internet agent 112) that may not be in a trusted environment. Advantageously, both authentication and encryption are handled end-to-end. The technique works without modification when no security is needed. Moreover, no modification to home gateway systems are required, thus removing a major deployment hurdle. Furthermore, server applications (web servers, game servers, FTP servers, IP telephony, etc.) need not be modified to enable access from the Internet. In fact, multiple instances of the server application (on different home server systems) can be used simultaneously. If the user enters unique server identification strings for multiple server instances, the forwarding agent 104 will use this to identify which server to send the data traffic to. If the user has the same server identification string for multiple server instances, the forwarding agent can send a connection request to all of them and use the first one that connects successfully. By using the parameters that authenticate the remote client 120 when logging into the Internet agent 112 for demultiplexing packets, it is possible for two remote users to use different instances of the same server application (such as a Web server).

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.).

Thus, embodiments of the present invention may be implemented as a method, system, device, or machine-readable medium (e.g. a processor readable medium or a computer readable medium) using standard programming and/or engineering techniques to produce software, firmware, hardware, middleware, or any combination thereof. The term "machine readable medium" (or alternatively, "processor readable medium" or "computer readable medium") as used herein is intended to encompass a medium accessible from any machine/process/computer for reading and execution. Of course, those skilled in the art will recognize that many modifications may be made to this configuration without departing from the scope of the present invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
   a home server including a service component installed in a network software stack, the service component to detect when a server application listens for a connection;
   a remote client coupled through the Internet and to the system by an Internet agent, the Internet agent listening on behalf of the home server for connection requests from a remote client;
   a forwarding agent directly connected to the home server, wherein the service component informs the forwarding agent that the server application is listening for a connection and forwards the access parameters to the forwarding agent, the forwarding agent to provide the Internet agent with access parameters received from the home server; and
   a gateway running a Network Address Translation (NAT) software program, the gateway connecting the forwarding agent to the Internet agent via the Internet;
   wherein, if the remote client provides proper access parameters to the Internet agent, the Internet agent provides the remote client access to a service running on the home server and the Internet agent and the forwarding agent act as layer 4 routers.

2. The system of claim 1, wherein the forwarding agent establishes an outgoing connection with the Internet agent through the NAT, to provide a channel for incoming connection requests.

3. The system of claim 2, wherein the service component allows access to the server application by a remote client by:
   a) inquiring whether a user would like the server application to be accessible from a remote client; and
   b) setting required access parameters.

4. A method comprising:
   detecting when a server application of a home server listens for a connection utilizing a service component installed in a network software stack;
   utilizing an Internet agent to couple a remote server through the Internet to the home server, the Internet agent listening on behalf of the home server for connection requests from a remote client;
   utilizing a forwarding agent directly connected to the home server to provide the Internet agent with access parameters received from the home server, wherein a service component of the home server informs the forwarding agent that the server application is listening for a connection and forwards the access parameters to the forwarding agent; and
   connecting the forwarding agent to the Internet and the Internet agent using a gateway running a Network Address Translation (NAT) software program;
   wherein, if the remote client provides proper access parameters to the Internet agent, the Internet agent provides the remote client access to a service running on the home server and the Internet agent and the forwarding agent act as layer 4 routers.

5. The method of claim 4, wherein the forwarding agent establishes an outgoing connection with the Internet agent through the NAT, to provide a channel for incoming connection requests.

6. The method of claim 5, wherein the service component allows access to the server application by a remote client by:
   a) inquiring whether a user would like the server application to be accessible from a remote client; and
   b) setting required access parameters.

* * * * *

UNITED STATES PATENT AND TRADEMARK OFFICE
CERTIFICATE OF CORRECTION

PATENT NO. : 7,010,608 B2  Page 1 of 1
APPLICATION NO. : 09/965934
DATED : March 7, 2006
INVENTOR(S) : Garg et al.

It is certified that error appears in the above-identified patent and that said Letters Patent is hereby corrected as shown below:

Column 7, at line 19, after "102" insert --(block 314)--.

Signed and Sealed this

Sixth Day of November, 2007

JON W. DUDAS
*Director of the United States Patent and Trademark Office*